United States Patent Office 2,872,348
Patented Feb. 3, 1959

2,872,348

FUSED SALT METHOD FOR COATING URANIUM WITH A METAL

Lowell D. Eubank, South Euclid, Ohio, assignor to the United States of America as represented by the United States Atomic Energy Commission No Drawing. Application May 6, 1946
Serial No. 667,734

13 Claims. (Cl. 117—71)

This invention relates to the application of metallic coatings to metals and is especially concerned with the application of protective coatings of less active metals to metal articles sensitive to corrosive conditions.

In the past protective coatings have been applied to metals by a variety of processes, such as dipping into molten metal, spraying with molten metal, electrodeposition, electromotive displacement from aqueous solutions, and the like.

The application of metals in molten form is in general restricted to coatings of relatively low melting-points and usually provides coatings of non-uniform thickness.

Electrodeposition and electromotive displacement from aqueous solutions are applicable to metals of all melting points and provide coatings which are relatively thin compared to coatings applied in molten form and which may have a high degree of uniformity. For the treatment of some metals these methods of application are subject to the disadvantage that the metal to be coated is attacked by the medium in which the coating is applied. Thus metals such as uranium are readily oxidized and are rapidly attacked by aqueous solutions employed in such processes.

An object of the present invention is the application of metallic protective coatings to more active metals by a coating process which does not involve a corrosive medium and at the same time is suitable for the application of coating metals of high melting points without the necessity for attaining temperatures above the melting point of the coating metal. A further object of the invention is the coating of active metals to provide very thin, uniform protective coatings. A still further object of the invention is the application of such coatings to metallic uranium articles. Further objects will be apparent from the following description of the invention and detailed examples of its application.

In accordance with this invention a metal to be protectively coated by a less active metal is brought into contact with a substantially anhydrous molten solution of a halide of the less active metal in a solvent comprising a halide of a more active metal, that is, a metal higher in the electromotive displacement series than the metal to be coated.

By selection of appropriate solvents having suitable melting points, the process can be carried out over a wide range of temperature conditions. Thus alkali-metal salt compositions may be prepared melting only slightly above 300° C. and when low application temperatures are desirable, such salts may be employed. Examples of such compositions are the rubidium-lithium-sodium chloride eutectic melting at 318° C. and the cesium-lithium-sodium chloride eutectic melting at 320° C. Less expensive mixtures melting at somewhat higher temperatures may be prepared from potassium, lithium, and sodium chlorides. A composition prepared by melting together 50 parts of lithium chloride, 40 parts of potassium chloride and 10 parts of sodium chloride is a preferred ternary salt composition of this type, the utility of which is shown below in Examples 1 to 5 and 9 to 11. For high application temperatures, a still greater variety of salt mixtures is available. Thus mixtures of alkaline earth metal chlorides, such as mixtures of calcium chloride and sodium chloride containing small proportions of potassium chloride, have been used with satsifactory results for relatively high temperature applications. For such applications, the salt bath comprising 52 parts of calcium chloride, 42 parts of sodium chloride, and 6 parts of potassium chloride is preferred as shown below in Examples 6, 7 and 8. As the examples below will show the preferred salt baths of this invention are ternary chloride compositions containing calcium chloride or lithium chloride admixed with sodium chloride and potassium chloride. The salt to be plated out is added as a chloride or fluoride to the ternary chloride baths described herein.

The process of the invention may be used for the application of various coating metals, such as zinc, tin, lead, copper, chromium, nickel, aluminum, iron, molybdenum, platinum, palladium, tantalum, and iridium on more active metals of this group, i. e., metals higher in the electromotive series. It may be used with especial benefit for the application of protective coatings of tin, lead, copper, chromium, nickel, or aluminum to iron, carbon steel, or chromium iron alloy articles; for the application of chromium and nickel protective coatings to magnesium and aluminum articles; and for the application of nickel, copper, chromium, iron, zinc, tin, cupro-nickel, and other protective coatings to metallic uranium articles.

The process is of particular value for the application of thin coatings for temporary protection of metals while they are subjected to further treatment, for example, coating by electrodeposition, or by lacquering, painting, calorizing, sherardizing, cementing, chromizing, and the like.

In the application of metallic coatings to uranium by electrodeposition from aqueous solutions and more particularly in the application of chromium platings, there is a tendency for the solution to oxidize the uranium and form a thin oxide film on the surface, especially in cracks and crevices. By coating the uranium by the process of this invention, it may be provided with a protective film of a less active metal and subsequently electroplated in aqueous solution without the attendant formation of uranium oxide film, which interferes with the ability to secure maximum adherence and uniformity. By a combination of electromotive displacement and electrodeposition, metallic uranium articles may be provided with valuable protective coatings of metallic chromium, which not only are adherent but uniformly coat the surface of the metal and protect minute fissures or flaws in the metal surface as well as the smooth outermost areas.

The coatings of the invention are valuable also as bases for hot-dip coatings or for coatings applied by molten metal spray processes. Since the highly oxidizable metal is protected by the less active metal coating, less care is necessary to avoid corrosion during subsequent coating processes.

The process is of value also in the application of thin permanent protective coatings to metal articles to be used without subsequent coating treatment. Thus in the provision of thin copper or lead coatings on iron or iron alloy articles to protect the metal during subsequent contact with hot combustion gases or during working or drawing operations, the coatings of the invention are sufficient.

The following examples, in which proportions are expressed in terms of weight unless otherwise indicated, show specific embodiments which further illustrate the invention.

Example 1

An alkali-metal solvent bath was prepared by melting together 50 parts of lithium chloride, 40 parts of potassium chloride, and 10 parts of sodium chloride and adding to the mixture 4½ parts of nickel chloride hexahydrate. The molten mixture was heated to 750° C. and a small metallic uranium article having clean uranium surfaces was immersed in the bath for 4 minutes. Upon removal from the bath the article was coated with a firmly adherent metallic nickel coating.

It should be noted that although the heaxhydrate of nickel chloride was employed, the temperature of the bath was sufficiently high to expel the water of hydration and consequently the solution employed was a substantially anhydrous solution of approximately 2.5% $NiCl_2$ in molten alkali-metal chloride.

Example 2

To 100 parts of an alkali-metal chloride bath of the same composition as employed in Example 1—i. e. 50 parts lithium chloride, 40 parts potassium chloride, and 10 parts sodium chloride—10 parts of chromium chloride decahydrate was added. The temperature of the bath was brought to 720° C. and a metallic uranium article was dipped into the molten bath and held immersed therein for 4 minutes. Upon removal from the bath the article was coated with a bright adherent metallic coating.

Under the conditions of this experiment the water of hydration in the chromium chloride decahydrate was almost instantly eliminated and any water remaining was in the form of water of constitution and not in the form of free water. Consequently the molten salt was anhydrous.

Example 3

Five parts more of chromium chloride decahydrate was added to the salt bath employed in Example 2 to increase the total $CrCl_3$ content to 7%. A clean metallic uranium article was dipped in this bath at 720° C. for 5 minutes. It was then removed from the solution, cleaned with pumice, and polished anodically. The resulting article had a highly polished specular chromium plating.

Example 4

An alkali-metal chloride solvent was prepared by melting together 50 parts lithium chloride, 40 parts potassium chloride, 10 parts sodium chloride. To this bath, at 720° C., 5 parts of cuprous chloride (CuCl) was added. A metallic uranium article was immersed in the resulting solution for three minutes at 720° C. Upon removal from the bath the article was coated with a thin uniform coating of metallic copper.

Example 5

An alkali-metal chloride solvent of the same composition as employed in Example 1 was heated to 530° C. and to 300 parts of this bath 5½ parts of nickel chloride hexahydrate was added. A small uranium object was dipped for 5 minutes in the resulting bath and held immersed therein for 5 minutes at 530° C. Upon removal it was coated with a thin uniform coating of metallic nickel.

The temperature employed in this process was likewise adequate to dehydrate the nickel chloride hexahydrate and consequently coating was effected under substantially anhydrous conditions.

Example 6

A small metallic uranium rod was immersed in an anhydrous salt solution comprising 52 parts $CaCl_2$, 42 parts NaCl, 6 parts KCl, and 5 parts $NiF_2$ at 780° C. for 5 seconds. The rod was withdrawn from this solution and found to be lightly coated with metallic nickel. It was then dipped immediately into a molten metal bath comprising 53% tin and 47% copper at 770° C. After one minute in this bath it was withdrawn and allowed to cool. The rod was thus coated with bronze.

Example 7

A small uranium article was cleaned by immersion in aqueous 35% $HNO_3$ solution at 82° C. for 10 minutes. The cleaned article was rinsed with water, dried, and immersed in a molten anhydrous mixture comprising 52 parts $CaCl_2$, 42 parts NaCl, 6 parts KCl, and 2 parts $NiF_2$ at 780° C. for 5 seconds. The article was then removed, cooled, cleaned, and washed. It was then passed through a top flux of 58% LiCl and 42% KCl into a molten metal bath comprising 53% tin and 47% copper at 770° C. and held therein for 10 minutes. The article was removed, cooled in a molten bath of 50% LiCl, 40% KCl and 10% NaCl to about 400° C., and then quenched by dipping in water. The uranium article was coated with a uniform coating of tin-copper alloy.

Example 8

A metallic uranium article was cleaned by immersion in aqueous 35% $HNO_3$ solution at 82° C. for 10 minutes. The article was removed, washed in water, dried, and then dipped into an anhydrous solution comprising 52 parts $CaCl_2$, 42 parts NaCl, 6 parts KCl and 1½ parts $CrCl_3$ at 800° C. After a 5 minute immersion in this bath, the article was removed, washed with water, and cleaned with a wire brush. It was then passed through a top flux comprising 50% LiCl, 40% KCl, and 10% NaCl into a molten tin-copper (53/47) bath at 850° C. The article was held in this bath for 6 minutes, then removed, and cooled as in the preceding example. A copper-tin alloy coating over a thin chromium layer was thus produced on the uranium article.

Example 9

To 100 parts of a salt bath of 50 parts LiCl, 40 parts KCl, and 10 parts NaCl, 2 parts of $ZnCl_2$ were added. While the bath was at a temperature of about 650° C., a small metallic uranium article was immersed in it for about 3 minutes. Upon withdrawal of the article from the bath, it was found to be covered with an adherent coating of zinc.

Example 10

The process of Example 9 was repeated substituting an equal amount of $PbCl_2$ for the $ZnCl_2$. An adherent lead coating was thus obtained.

Example 11

The process of Example 9 was repeated substituting an equal amount of $AlCl_3$ for the $ZnCl_2$. An adherent aluminum coating was thus obtained.

It will be understood that I intend to include variations and modifications of the invention and that the preceding examples are illustrations only, and in no wise to be construed as limitations upon the invention, the scope of which is defined in the appended claims, wherein I claim:

1. The method of coating uranium with a less active metal which comprises immersing the uranium in a substantially anhydrous molten solution of a halide of said less active metal in a ternary chloride composition which consists of KCl, NaCl, and a chloride selected from the group consisting of LiCl and $CaCl_2$, said composition being one selected from the group consisting of (a) a composition which consists of 50% by weight of LiCl, 40% by weight of KCl, and 10% by weight of NaCl, and (b) a composition which consists of 52% by weight of $CaCl_2$, 42% by weight of NaCl, and 6% by weight of KCl.

2. A process as set forth in claim 1 in which the coated uranium is provided with a further coating of metal by dipping in a molten metal bath.

3. The method of coating uranium with a less active metal which comprises immersing the uranium in a substantially anhydrous molten solution of a halide of said less active metal in a ternary chloride composition which consists of 52% by weight of $CaCl_2$, 42% by weight of NaCl, and 6% by weight of KCl.

4. The method of coating uranium with a less active metal which comprises immersing the uranium in a substantially anhydrous molten solution of a halide of said less active metal in a ternary chloride composition which consists of 50% by weight of LiCl, 40% by weight of KCl, and 20% by weight of NaCl.

5. The method of coating uranium with chromium which comprises immersing the uranium in a substantially anhydrous molten solution of $CrCl_3$ in a ternary chloride composition which consists of KCl, NaCl, and a chloride selected from the group consisting of LiCl and $CaCl_2$, said composition being one selected from the group consisting of (a) a composition which consists of 50% by weight of LiCl, 40% by weight of KCl, and 10% by weight of NaCl, and (b) a composition which consists of 52% by weight of $CaCl_2$, 42% by weight of NaCl, and 6% by weight of KCl.

6. The method of coating uranium with chromium which comprises immersing the uranium in a substantially anhydrous molten solution of $CrCl_3$ in a ternary chloride composition which consists of 50% by weight of LiCl, 40% by weight of KCl, and 10% by weight of NaCl at a temperature of about 720° C.

7. The method of coating uranium with chromium which comprises immersing the uranium in a substantially anhydrous molten solution of $CrCl_3$ in a ternary chloride composition which consists of 52% by weight of $CaCl_2$, 42% by weight of NaCl, and 6% by weight of KCl at a temperature of about 800° C.

8. The method of coating uranium which comprises cleaning a metallic uranium article by immersion in a 35% aqueous $HNO_3$ solution at 82° C., for 10 minutes, immersing the cleaned article in a substantially anhydrous molten solution of $CrCl_3$ in a ternary chloride composition which consists of 52% by weight of $CaCl_2$, 42% by weight of NaCl, and 6% by weight of KCl at a temperature of about 800° C. for a period of about 5 minutes, passing the chromium coated uranium article thus obtained through a top flux consisting of 50% by weight of LiCl, 40% by weight of KCl, and 10% by weight of NaCl into a molten alloy bath containing 53% by weight of tin and 47% by weight of copper and heated to a temperature of about 850° C., holding the article in this alloy bath for about 6 minutes, cooling the tin-copper alloy coated article to about 400° C. in a molten bath containing 50% of LiCl, 40% of KCl and 10% of NaCl, and then quenching the article by dipping it in water.

9. The method of coating uranium with a thin protective layer of metallic nickel which comprises immersing the uranium in a substantially anhydrous molten solution of a nickel halide in a ternary chloride composition which consists of KCl, NaCl, and a chloride selected from the group consisting of LiCl and $CaCl_2$, said composition being one selected from the group consisting of (a) a composition which consists of 50% by weight of LiCl, 40% by weight of KCl, and 10% by weight of NaCl, and (b) a composition which consists of 52% by weight of $CaCl_2$, 42% by weight of NaCl, and 6% by weight of KCl.

10. The method of coating uranium with a thin protective layer of metallic nickel which comprises immersing the uranium in a substantially anhydrous molten solution of $NiCl_2$ in a ternary chloride composition which consists of 50% by weight of LiCl, 40% by weight of KCl, and 10% by weight of NaCl.

11. The method of coating uranium with a thin protective layer of metallic nickel which comprises immersing the uranium in a substantially anhydrous molten solution of $NiF_2$ in a ternary chloride composition which consists of 52% by weight of $CaCl_2$, 42% by weight of NaCl and 6% by weight of KCl at a temperature of about 780° C.

12. The method of coating uranium with comprises immersing the uranium in a substantially anhydrous molten solution of $NiF_2$ in a ternary chloride composition which consists of 52% by weight of $CaCl_2$, 42% by weight of NaCl, and 6% by weight of KCl at a temperature of about 780° C. for a period of about 5 seconds, and then dipping the nickel plated uranium thus obtained into a molten alloy bath containing 53% by weight of tin and 47% by weight of copper and heated to a temperature of about 770° C. to provide a tin-coper alloy coating thereupon.

13. The method of coating uranium with a thin protective layer of metallic copper which comprises immersing the uranium in a substantially anhydrous molten solution of cuprous chloride in a ternary chloride composition which consists of 50% by weight of LiCl, 40% by weight of KCl and 10% by weight of NaCl at a temperature of about 720° C.

References Cited in the file of this patent

UNITED STATES PATENTS

| | | |
|---|---|---|
| 141,132 | Gauduin et al. | July 22, 1873 |
| 1,941,750 | Johansson | Jan. 2, 1934 |
| 2,046,638 | Lauenstein et al. | July 7, 1936 |
| 2,299,166 | Miller | Oct. 20, 1942 |
| 2,472,393 | Avallone et al. | June 7, 1949 |
| 2,479,882 | Wallhausen et al. | Aug. 23, 1949 |
| 2,555,372 | Ramage | June 5, 1951 |

FOREIGN PATENTS

Hackh's Chemical Dictionary, 3rd ed. (1944), p. 529.
Metals and Alloys Dictionary, Merlub-Sobel Chem. Publ. Co., Brooklyn, N. Y. (1944), p. 149.
Metals Handbook, 1948 ed., p. 9.